Nov. 19, 1968  W. R. BOYD ET AL  3,412,263

DERIVATIVE CIRCUIT

Filed April 11, 1966

WILLIAM R. BOYD
ROBERT C. FRANKLIN
*INVENTORS*

BY Louis Mok

ATTORNEY

United States Patent Office 3,412,263
Patented Nov. 19, 1968

3,412,263
DERIVATIVE CIRCUIT
William R. Boyd, Oakland, and Robert C. Franklin, San
Jose, Calif., assignors to Beckman Instruments, Inc., a
corporation of California
Filed Apr. 11, 1966, Ser. No. 541,833
5 Claims. (Cl. 307—229)

This invention relates in general to derivative circuits and in particular, to circuits for obtaining a finite difference approximation to the derivative of a function $y=f(x)$.

Analog devices, such as operational amplifiers, for providing differentials or derivatives of electrical signals, are well known. The usefulness of these circuits, however, is limited in several ways. For example, since analog differentiators amplify the high frequency or noise components of the incoming signal, a limitation must be placed upon the frequency range which may be handled by the circuit. In the case of the operational amplifier, this may be accomplished by connecting a resistance in series with the input capacitor and adding at least one other filtering element, for example, a capacitor, connected across the feedback resistor. Adjustment of the various time constants permits the frequency characteristic curve (gain vs. frequency) to be shifted along the abscissa or frequency axis. Control of the frequency at which cut-off occurs is thereby achieved and the gain at given frequencies can be adjusted. It may be seen, however, that multiple control devices, each requiring individual adjustment, must be provided to accomplish the desired shifting of the frequency characterstic curve. In addition, it is inevitable that some interaction will occur; thus, adjustment of one control device may require readjustment of the others and so on.

Accordingly, it is an overall object of the present invention to provide an improved derivative circuit which, by manipulation of a single control, can accommodate a wide range of incoming signal frequencies.

In accordance with one specific, exemplary embodiment of the present invention shown and described herein, there is provided basically a "sample, hold and subtract" circuit comprising a number of gates and storage devices for sampling the incoming signal (representing the function) periodically, storing the most recent sample and the previous sample, and providing a comparison between the amplitudes of these two samples. The difference between the two samples, which appears at the output of the circuit, represents the derivative. A means is provided for closing the gates in the appropriate sequence. This means may typically take the form of two, out-of-phase clock drives providing equally spaced pulses for the gates. By varying the pulse rate, that is, the sampling rate, the gain and resolution of the circuit may be controlled over a wide range of frequencies. The term "gain" as used herein, means the ratio between the amplitude of the input, or function signal, and the amplitude of the output, or derivative, signal which is the difference between the successive samples. It will be evident that as the resolution is increased, that is, as the sampling rate is increased, the amplitude of the derivative signal will decrease resulting in a decrease in gain.

The novel features which are believed to be characteristic of the invention are set forth with particularity in the appended claims. The invention itself, however, together with further objects and advantages thereof, can best be understood by reference to the following description taken in connection with the accompanying drawings in which:

Figure 1:
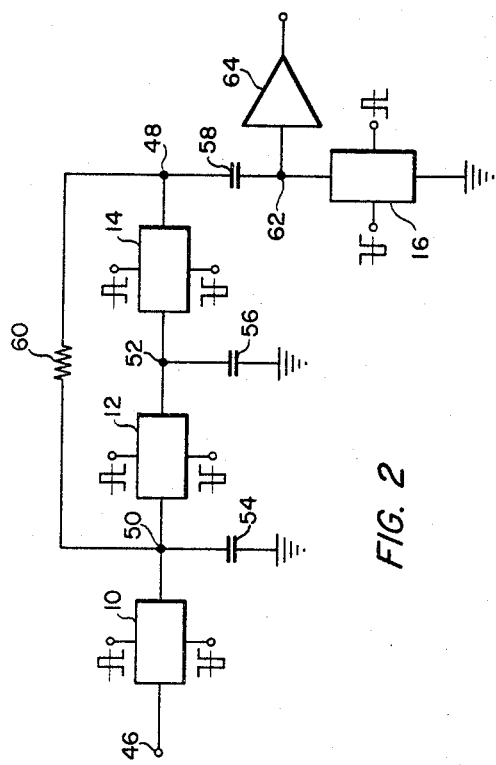
FIG. 1 is a plot of the function $y=f(x)$ illustrating the finite difference approximation to the derivative of the function.

Turning now to the drawings, FIG. 1 shows a plot of a function $y=f(x)$ whose derivative is to be obtained. The derivative of the function at any point P (located at the coordinates $x_1$, $y_1$) is the rate of change of $y$ with respect to $x$ and this rate of change, or slope, may be represented by the line PT which is tangent to the curve at the point P. The tangent PT may also be viewed as the limiting position of a line PQ when Q (located at the coordinates $x_2$, $y_2$) approaches P. As Q gets closer to P the line PQ comes closer to coinciding with the tangent PT. Hence, the rate of change given by the line PQ becomes an approximation of the rate of change given by PT. The rate of change represented by PQ may be expressed as $RQ/PR$ or $(y_2-y_1)/(x_2-x_1)$, this ratio being the average rate of change of $y$ in the interval $x_1$ to $x_2$. This may also be viewed as approximating the slope of the curve at the midpoint between P and Q. It will be seen that if values of $y$ are compared over successive, equal intervals of $x$, approximations of the derivative along the entire curve may be obtained. The more samples taken, the better the resolution; however, the difference $y_2-y_1$ for each sample will be decreased accordingly.

Figure 2:
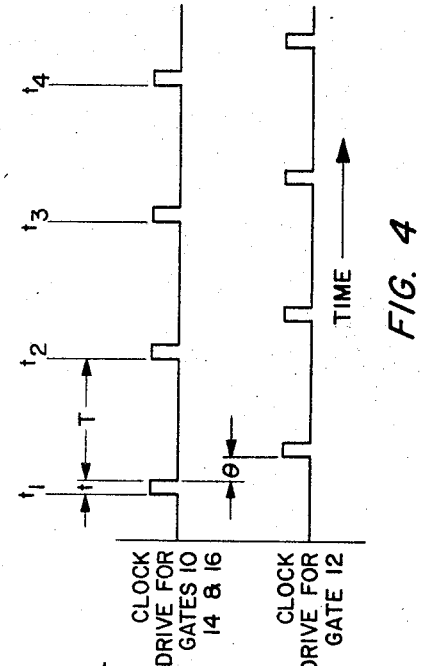
FIG. 2 is a schematic of a derivative circuit in accordance with the present invention.
Figure 3:
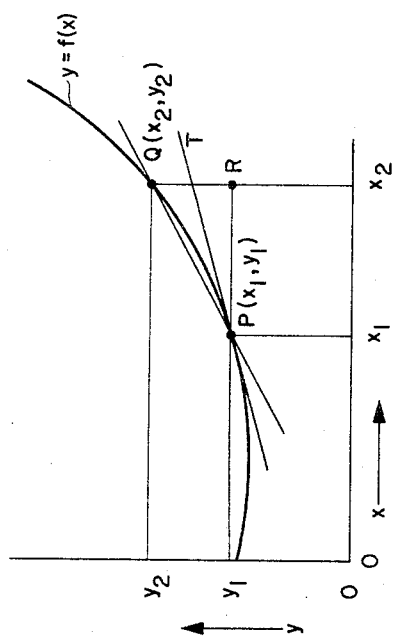
FIG. 3 shows a schematic of a gate circuit which may be used in the derivative circuit of the present invention.

A circuit for obtaining derivatives in the above-described manner is shown in FIG. 2. The rectangular blocks 10, 12, 14 and 16 each represent a sampling gate capable of reproducing at the output voltages appearing at the input with very little discharge of the input. Although any sampling gate which meets these requirements may be employed, a preferred circuit, called the "diamond circuit" is shown in FIG. 3. A detailed description of this circuit may be found in MIT Lincoln Laboratory Technical Report No. 300, by R. H. Baker et al., dated January 30, 1963 and entitled "The Diamond Circuit."

Briefly, the "diamond circuit" is a hybrid analog-digital circuit in the form of a transistor bridge network having a large power gain and a voltage gain of approximately unity. The basic circuit comprises two PNP transistors 18 and 20 and two NPN transistors 22 and 24 connected in a bridge defined by nodes 26, 28, 30 and 32. Node 26 interconnects the bases of transistors 18 and 22; node point 28 joins the emitters of the transistors 20 and 24; node 30 joins the emitter of the transistor 18 with the base of transistor 24; and node 32 connects the emitter of transistor 22 with the base of transistor 20. The input to the bridge is applied to a terminal 34 connected to the node 26 while the output is derived at a terminal 36 connected to the node point 28. Any suitable source of positive and negative D.C. voltage (not shown), applied to the collectors of the transistors 22 and 24 and the transistors 18 and 20, respectively, may be utilized to power the circuit.

In the sampling gate configuration of the "diamond circuit" depicted in FIG. 3, the incoming signal, which may be considered to be continuously present, is applied across an analog storage element, connected between the terminal 34 and a source of reference potential, such as ground. The storage element may typically take the form of a capacitor 38. The output signal appears across a second analog storage device, such as the capacitor 40, connected between the output terminal 36 and ground.

The "diamond circuit" is driven into periodic conduction by positive and negative, constant current gating pulses $i_g$ of duration $t$ applied simultaneously to the nodes 30 and 32 via terminals 42 and 44, respectively. When the gating pulses occur, the input voltage is transferred to the output capacitor 40. As a result of the high current gain, there is minimal loading of the input and the voltage on the input capacitor 38 is reproduced very closely on the output capacitor 40. When the gating pulse is removed, the network appears as an open circuit.

Referring again to the exemplary embodiment of the derivative circuit of FIG. 2, the sampling gates 10, 12 and 14 are serially connected between an input terminal 46 and a junction 48. Junction points 50 and 52 interconnect the gates 10 and 12 and gates 12 and 14, respectively. A capacitor 54 is coupled between the point 50 and ground. A series combination of a third capacitor 58 and the sampling gate 16 is connected between the junction 48 and ground. A coupling impedance such as the resistor 60 connects the junctions 48 and 50. The output of the derivative circuit may be taken at a point 62 between the capacitor 58 and the sampling gate 16, the output load typically taking the form of a high input impedance device such as a D.C. amplifier 64.

Figure 4:
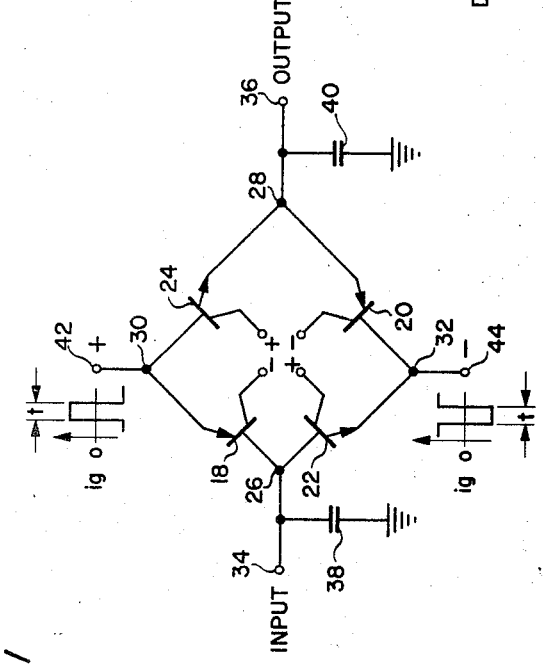
FIG. 4 is a graphical representation of clock drives for activating gates of the type depicted in FIG. 3.

In order for the derivative circuit to operate in continuous sequence, trains of spaced gating pulses, that is, clock drives, are applied to the terminals 42 and 44 of the gates. These pulses may be derived from any suitable pulse source such as a pulse generating relaxation oscillator. FIG. 4 depicts graphically the waveforms of the two clock drives provided for the operation of the derivative circuit. Only the positive pulses for each drive are shown in FIG. 4, it being understood that each drive has a negative counterpart. As indicated in FIG. 4, the first clock drive operates the gates 10, 14 and 16 and the second drive operates the gate 12. The duration or width of each pulse is designated as $t$ and the time between successive pulses is T. In one typical circuit constructed in accordance with the present invention, $t$ was 6 $\mu$s. and T was was made variable between 2 ms. and 1 sec. Since the input voltage to each gate is continuously present and since transfer of this voltage only take place when a gating pulse is applied, it will be apparent that the charge time of capacitors 54, 56 and 58 must be smaller than the pulse width $t$. The pulses of the second clock drive lag the pulses of the first drive by a time $\theta$. In the typical circuit mentioned above, $\theta$ was set at 20 $\mu$s. It is to be noted that the clock drive exemplified in FIG. 4 may be governed solely by time or by any other variable, for example, distance, provided only that the variable can be converted to pulse rate.

The operation of a derivative circuit in accordance with the present invention is as follows: A continuous, varying voltage V, representing the function $y=f(x)$ whose derivative $y'=f'(x)$ is desired, is applied to the input terminal 46. Starting now at time $t_1$ (FIG. 4), gates 10, 14 and 16 are energized by the first clock drive and the capacitor 54 charges to the input voltage $V_1$ appearing at time $t_1$. During the interval $\theta$ following the first pulse, all gates appear as open circuits. At the end of $\theta$, the second clock drive pulses the gate 12 (the gates 10, 14 and 16 remaining as open circuits) and $V_1$ is transferred to capacitor 56. Capacitors 54 and 56 are now both charged to approximately the voltage $V_1$. Until the next pulse at $t_2$, all gates are again open circuits. At $t_2$, with gates 10, 14 and 16 driven into operation by the first clock drive, the capacitor 54 charges to a new input voltage $V_2$, the voltages on capacitors 56 and 58 equalize at approximately $V_1$ and the junction point 62 is at ground potential. Upon removal of the pulse $t_2$, all gates appear again as open circuits. However, since the upper end of capacitors 54 and 58 are coupled by the resistor 60, the difference between the voltage on capacitors 54 and 58, that is, $V_2-V_1$, appears at the point 62 which is the input to the amplifier 64. It is to be noted that virtually no current flows in the path comprising ground, capacitor 54, resistor 60, capacitor 58 and the amplifier 64 because of the high input impedance of the amplifier 64. With the arrival of the pulse from the second clock drive at a time $\theta$ after the pulse at $t_2$, the voltage $V_2$ on capacitor 54 is transferred to capacitor 56. At $t_3$, the clock drive energizes gates 10, 14 and 16 and a new voltage $V_3$ is placed on capacitor 54, $V_2$ is transferred from capacitor 56 to capacitor 58, and the point 62, that is, the input to the amplifier 64, is grounded. After the pulse at $t_3$, the input to amplifier 64 now senses $V_3-V_2$. The above described process continues as long as desired, successive input voltage differences, representing the derivative of the function, appearing at the input of the amplifier 64. If the time intervals between the clock drive pulses are maintained equal, that is, if $t_2-t_1=t_3-t_2=t_n-t_{n-1}$, then the successive input voltage differences will represent successive finite difference approximations of the derivative of the input voltage which, as stated earlier, may be made to represent the function $y=f(x)$.

It will be seen that the gain of the system is proportional to the time interval between drive pulses. Therefore, the effect of varying the time interval between the clock drive pulses is analogous to varying the time constants in derivative circuits of the operational amplifier type and the position of the frequency characteristic curve can thereby be shifted with one control. Further, in the circuit of the present invention, any noise in the signal is present in the output without amplification, if noise is defined as those components of the input which are of high frequency as compared to the clock pulse rate. An improved derivative circuit, employing hybrid analog-digital techniques has thereby been provided.

It will be obvious to those skilled in the art that various modifications may be made to the specific exemplary embodiments of the invention described. While particular embodiments have been discussed, it will be understood that the invention is not limited thereto and that it is contemplated to cover in the appended claims any such modifications as fall within the true spirit and scope of the invention.

What is claimed is:

1. A circuit for obtaining as an input to a high input impedance device, the finite difference approximation to the derivative of a function $y=f(x)$, in which $f(x)$ represents any independent variable, said function being represented by an electrical signal whose voltage, with respect to a reference potential, varies in accordance with said function, comprising first, second and third normally open gates connected in series, said first gate having an input for receiving said electrical signal and said third gate having an output;

first and second analog voltage storage elements, said first element being connected between said reference potential and the junction of said first and second gates, said second element being connected between said reference potential and the junction of said second and third gates;

a third analog voltage storage element;

a fourth normally open gate, said third storage element and said fourth gate being connected, in the order stated, between said output of said third gate and said reference potential, the input of the high input impedance device being connected to the junction of said third storage device and said fourth gate;

an impedance connected between said output of said third gate and said junction of said first and second gates; and means connected to said gates for closing said first, third and fourth gates as a group alternately with said second gate.

2. A circuit, as defined in claim 1, in which said gates have high current gain and said analog voltage storage elements comprise capacitors.

3. A circuit, as defined in claim 1, in which said means for closing said gates comprises a pulse generator providing a first clock drive of equally-spaced pulses for said first, third and fourth gates, and a second clock drive of equally-spaced pulses for said second gate, said first and second clock drives being out of phase.

4. A circuit, as defined in claim 3, in which the frequencies of said first and second clock drives are adjustable whereby the gain and resolution of said derivative circuit may be controlled.

5. A circuit, as defined in claim 1, in which said means for closing said gates provides clock drive pulses for said gates generated on a basis other than time.

References Cited

UNITED STATES PATENTS

| | | | |
|---|---|---|---|
| 3,302,039 | 1/1967 | Baker | 307—229 |
| 3,363,113 | 1/1968 | Bedingfield | 307—238 |

ARTHUR GAUSS, *Primary Examiner.*

B. P. DAVIS, *Assistant Examiner.*